Figure 3:
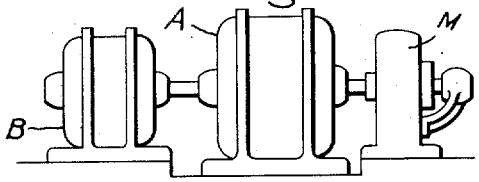

E. F. W. ALEXANDERSON.

PHASE BALANCER.

APPLICATION FILED AUG. 3, 1915.

Reissued May 16, 1916. 14,133.

Inventor:
Ernst F. W. Alexanderson,
by Albert G. Davis
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

PHASE-BALANCER.

14,133. Specification of Reissued Letters Patent. Reissued May 16, 1916.

Original No. 1,093,594, dated April 21, 1914, Serial No. 704,706. Application for reissue filed August 3, 1915. Serial No. 43,492.

*To all whom it may concern:*

Be it known that I, ERNST F. W. ALEXANDERSON, a citizen of the United States, residing at Schenectady, county of Schenectady, State of New York, have invented certain new and useful Improvements in Phase-Balancers, of which the following is a specification.

My invention relates to a phase balancer for polyphase transmission systems.

The voltage and current of polyphase transmission systems is often unbalanced because a single phase load or lighting circuits are connected thereto, or because unbalanced polyphase apparatus is operated from the systems. Such unbalancing limits the usefulness of the transmission system and causes the apparatus connected to the system to be special and expensive. In cases of emergency it is often desirable to interchange power between systems, but it is objectionable to do this when one of the systems is balanced and the other unbalanced, because the balanced system will become thereby unbalanced.

My invention has for its object to balance such a polyphase transmission system in a simple and efficient manner by employing a phase balancer comprising a polyphase dynamo-electric machine and an auxiliary adjustable source of alternating electromotive force of the same frequency connected thereto in such a way as to force current to be drawn from one phase of the polyphase system through the polyphase machine and delivered to another or other phases of such system. The auxiliary adjustable source of electromotive force is regulated in such a manner, depending upon the amount of single phase load on the system, that the current transferred from one phase to the other by the phase balancer neutralizes or balances the single phase load, so that the resulting load on the system is balanced polyphase. The auxiliary alternating electromotive force thus introduced into the circuits of the polyphase machine should be variable in phase and in magnitude in order to compensate for various amounts of load of various power factors in the different phases. If the system carries a single phase load of a known power factor on only one phase, the auxiliary alternating electromotive force may be of a constant phase but adjustable in magnitude.

Another feature of my invention relates to the improvement of power factor in addition to the balancing of the load. This is done by developing the polyphase dynamo-electric machine of the balancer as a synchronous machine with an adjustable excitation. When a synchronous dynamo-electric machine is used, the preferred method of generating the auxiliary alternating electromotive force is by a synchronous generator mounted on the same shaft as the main machine.

The operation of the phase balancer can be best understood if it is illustrated as a quarter phase machine, but of course the operation is in principle the same in a polyphase system of any number of phases, and a three phase arrangement will in most cases be preferred. It will, of course, be understood that where I have herein spoken of a transfer of load from one phase to another of a polyphase system, I intend to cover a system of any number of phases, and thus a system of more than two phases where the transfer of load is from one or more phases of the system to one or more phases thereof.

If a single phase load is taken from one phase of a quarter phase system the energy component of this load can be balanced only by drawing one half of the energy of the single phase load from the other phase of the system and delivering it to the phase carrying the single phase load. In order to perform this function, the phase balancer must act as a motor in one phase and as a generator in the other phase. Thus, the electromotive force of the phase balancer is in the motor phase opposite to the flow of the energy current and in the generator phase the electromotive force is in the same direction as the energy current. These relations of currents and electromotive forces can be described by saying that the currents and the electromotive forces have opposite phase rotation. This relation, defined as opposite phase rotation, will exist in a phase balancer of any number of phases, although it can not be said, as in a quarter phase system, that one phase is the motor phase and the other phase the generator phase. In an ordinary polyphase dynamo-electric machine there is no tendency for a current to flow with opposite phase rotation to the electromotive force, and in order to compel such a current to flow an auxiliary alternating electromotive force is needed. It is immaterial from what source this auxiliary alternating electromotive force is derived, as long as it is of the same frequency as the system and is adjustable in magnitude as well as in phase. It is generally preferable to introduce into each phase of the polyphase dynamo-electric machine the required amount of electromotive force to make the desired current flow in that phase.

When a synchronous polyphase dynamo-electric machine is used in the phase balancer for the sake of improving the power factor of the system, the preferred method of introducing the auxiliary alternating electromotive force, as already mentioned, is through an auxiliary synchronous dynamo-electric machine mounted on the same shaft as the main machine, and the preferred way of arranging this auxiliary machine is to provide it with a polyphase winding of the same number of phases as the main machine and connect each phase of the auxiliary machine in series with the corresponding phase of the main machine. It is thus possible to furnish to each phase winding of the main machine an auxiliary alternating electromotive force of the proper phase and magnitude for forcing the desired current to flow through each winding. The auxiliary electromotive force which controls the flow of current in the main machine can be adjusted by regulating the field of the auxiliary machine. The phase of the auxiliary electromotive force may be regulated by employing in connection with the auxiliary machine two field windings arranged in 90 degree space relation, whereby it is possible to control the phase as well as the magnitude of the auxiliary electromotive force by electrical adjustments. These adjustments may be made in any suitable manner, as for example, by an automatic regulator of the Tirrill type. The regulator can also be arranged so as to compensate for only part of the unbalancing in the current or voltage.

Other features of novelty which characterize my invention are pointed out with particularity in the claims annexed to and forming a part of this specification.

For a better understanding of my invention, reference may be had to the following description taken in connection with the accompanying drawing in which—

Figure 4:
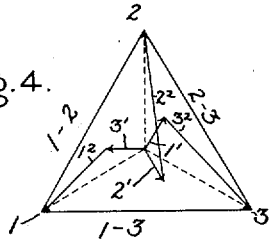
Figure 1:
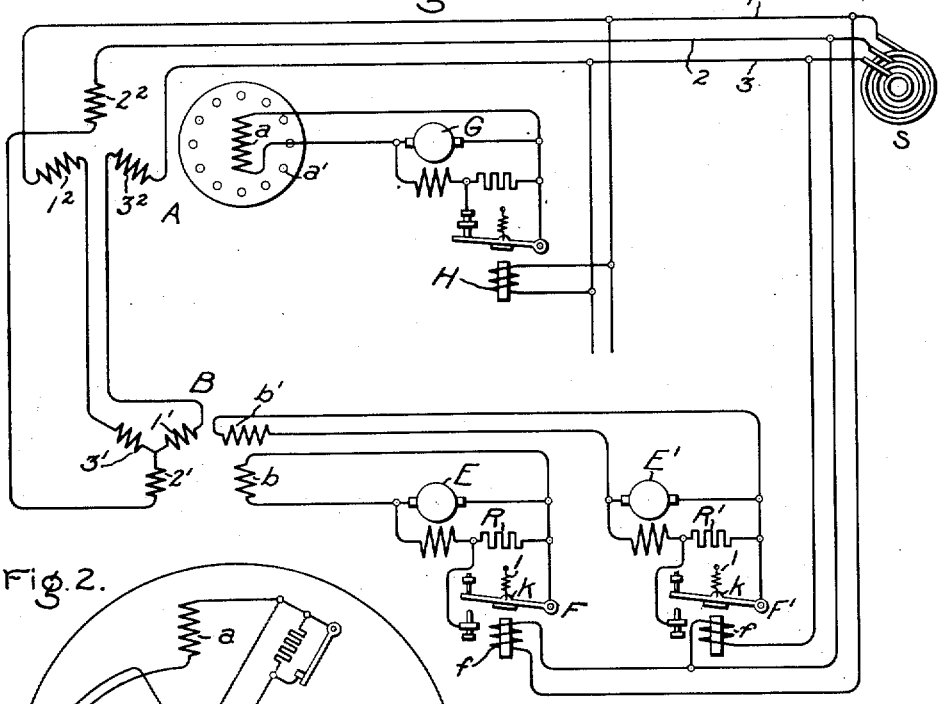
Figure 2:
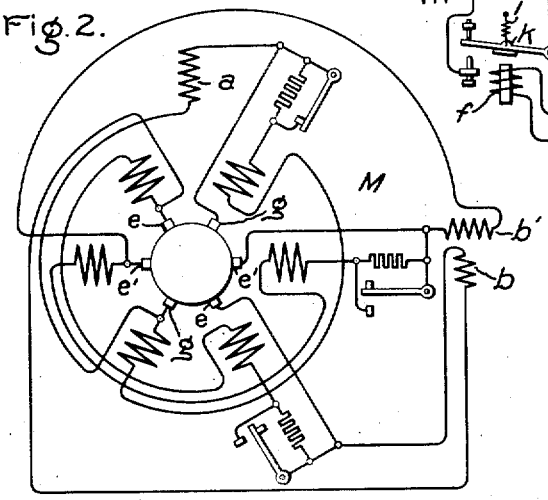

Figure 1 shows diagrammatically a system arranged in accordance with my invention; Fig. 2 shows diagrammatically a modification of a portion of the system of Fig. 1; Fig. 3 is an outline of the apparatus used in carrying out the modified system, and Fig. 4 is a voltage diagram.

In the accompanying drawings, I have illustrated what I now consider a preferable embodiment of my invention, in which the polyphase dynamo-electric machine of the phase balancer is a synchronous machine and the auxiliary source of alternating electromotive force of the same frequency, for forcing the necessary phase-balancing currents to flow through the circuits of the polyphase dynamo-electric machine, is furnished by a polyphase dynamo-electric machine. As heretofore stated, however, I wish it to be understood that my invention is not limited to the use of a synchronous machine as the polyphase dynamo-electric machine, or to the use of a polyphase dynamo-electric machine as the auxiliary source of alternating electromotive force for forcing currents, representing the transfer of load from one phase to another, to flow in the circuits of said polyphase machine.

Referring to the drawing, S is a source of alternating current power connected to polyphase mains 1, 2, 3 of a transmission system. An unbalanced load may be connected to this system, for example, by connecting single phase translating devices to the single phase mains connected to the two outside mains 1 and 3. This unbalanced load will tend to cause a component of energy, as for example the voltage between mains 1 and 3 to be less than the voltage between mains 1 and 2, and mains 2 and 3. In order to correct this unbalancing of the voltage between the mains, I provide a phase-balancer which comprises a synchronous dynamo-electric machine A and an auxiliary dynamo-electric machine B connected in series across the mains, the phase rotation of the machine A and the auxiliary machine B preferably being opposite. Preferably also the phase relation of their voltages is adapted to be relatively shifted. I prefer to shift the phase of the voltage of the auxiliary machine relatively to that of the synchronous machine. The synchronous machine A and the auxiliary machine B are preferably mechanically connected together. In order to shift the phase of the voltage of the auxiliary machine relatively to that of the synchronous machine, I provide the auxiliary machine with a field winding comprising a plurality of portions having different magnetic axes and relatively vary their excitation. I have shown the auxiliary machine field winding as composed of two portions $b$ and $b'$ having their magnetic axes arranged at substantially 90 electrical degrees, each portion having a source of excitation which may be varied, such as direct current exciters E and E′. The armature of the auxiliary machine B may be connected between the synchronous machine and the mains or it may be connected as hereinafter described. If it is connected between the synchronous machine and the mains, it will be necessary to insulate it for the potential of the mains. I have shown a three-phase system in the drawing, in which the armature of the three-phase auxiliary machine B is connected in series with the armature of the three-phase synchronous machine A so as to form the Y-point for the machine A. By thus connecting the auxiliary machine B, its windings are connected between the neutral point and the windings of machine A and consequently need only be insulated for the voltage, which it is designed to generate. Regulators F, dependent upon the voltage of the mains 1, 2 and 3, may be provided for relatively changing the phase relation of the voltages of the machines A and B.

The armature of auxiliary machine B has three phases 1′, 2′ and 3′, which are connected in Y. The armature of the synchronous machine A has three phases $1^2$, $2^2$ and $3^2$, each of which is connected at one end to the corresponding main. The other ends of the phases of the armature of the machine A are connected to the ends of the phases of the armature of auxiliary machine B, phase $2^2$ of machine A being connected to phase 2′ of auxiliary machine B but in such a manner that the voltage of this phase of the auxiliary machine opposes that of phase $2^2$ of the synchronous machine, phase $1^2$ and phase $3^2$ of machine A being connected to phase 3′ and phase 1′ of machine B, respectively. With this connection of the phases of the machines A and B, their phase rotation is opposite. The synchronous machine A has a field winding *a* excited from a suitable source, such as an exciter G. I have also shown the field of machine A provided with an amortisseur winding *a′* to increase its synchronizing power and to dampen out pulsations due to single phase armature reactions, which occur because part of the armature windings act as motor windings and the other parts of the armature windings act as generator windings. The field excitation of the machine A may be regulated by means of a regulator H, which depends on the unbalanced load across the mains 1 and 3. I have shown the regulator H diagrammatically as a voltage regulator of the Tirrill type, the operation of which is well understood.

Consider the mains 1, 2, 3 supplying among other loads, an unbalanced load across mains 1 and 3, this will tend to reduce the voltage between these mains while the voltage between mains 1 and 2, and mains 2 and 3 will tend to rise. By the use of my phase balancer described above, the voltage between the mains 1 and 3 is increased while the voltage between the mains 1 and 2, and 2 and 3 is reduced. This is due to the fact that two of the phases of the phase balancer act as generators, while the third phase acts as a motor. The motor phase is phase 2, and it takes power from main 2 and returns power to mains 1 and 3.

In order to explain the theory of operation of my phase balancer, the winding on synchronous machine A will be considered as arranged along two axes which are substantially at right angles, phase $2^2$ being arranged along one axis and phases $1^2$, $3^2$ being arranged along the other axis. The winding on auxiliary machine B will be considered as similarly arranged, phase 2′ being arranged along one axis and phases 3′ and 1′ being arranged along the other axis. Since as explained above, phase 2 of the phase balancer is a motor phase, the current flowing in phase $2^2$ of the synchronous machine A, considered as arranged along one axis, is reversed with respect to the voltage generated therein, but since phases 1 and 3 of the phase balancer, are generator phases, the current flowing in phases $1^2$ and $3^2$ of synchronous machine A, considered as arranged along an axis at right angles to that of phase $2^2$, is in the same direction as the voltage generated therein. From this it will be seen that the phase rotation of the current in machine A is opposite to the phase rotation of the voltage therein. In order to make current flow from phase $2^2$ into phases $1^2$ and $3^2$ of the synchronous machine, it is necessary to supply electromotive force to pump this current. This source of electromotive force is the auxiliary machine B. The flow of current in the auxiliary machine B is in the same direction as in synchronous machine A, because the current flowing out of phase $2^2$ of synchronous machine A flows into phase 2′ of auxiliary machine B, and the current flowing out of phases 3′ and 1′ of auxiliary machine B flows into phases $1^2$ and $3^2$ of synchronous machine A. It will therefore be seen that the phase rotation of the current in synchronous machine A and auxiliary machine B is the same, but all the phases of auxiliary machine B, act as generator phases, that is, the voltage generated in these windings is in the same direction as the current flowing therein, and consequently the phase rotation of the voltage of auxiliary machine B is opposite to the phase rotation of the voltage of synchronous machine A.

In order to balance the voltages between the mains, the phase relation of the voltages of machine A and auxiliary machine B is shifted, as explained above, until the voltages between the mains are equal. The resultant field of auxiliary machine B may be shifted through 360° by suitably varying and reversing the excitation of the portions $b$ and $b'$ of the auxiliary machine field winding.

Referring to the voltage diagram of Fig. 4, the various voltage vectors are lettered to correspond to the mains and the portions of the various machines in which the voltage is produced or on which the voltage is impressed, thus the vector lettered 1—2 corresponds to the voltage between mains 1—2, the vector $1^2$ corresponds to the terminal voltage of phase $1^2$ of machine A; the vector $3'$ corresponds to the voltage of phase $3'$ of auxiliary machine B, etc.

Each of the regulators F and F′ comprises a magnet $f$ connected to two of the polyphase mains. Each magnet controls a vibratory contact $k$ working against a spring $l$ in a manner which is well understood in connection with the operation of a Tirrill regulator, which I have shown diagrammatically. The vibratory contacts $k$ cut in and out resistances R and R′ in the field circuits of the exciters E and E′. The contacts are arranged, however, so that when the voltage between two of the mains is high, one of the resistances R or R′ is shortcircuited and the field of the corresponding exciter increased thus increasing the voltage of the exciter and the part of the field of the auxiliary machine B supplied thereby. Consider the case in which the voltage between mains 1 and 2 is high, then the corresponding regulator operates to increase the voltage of exciter E and the excitation of the portion $b$ of the field winding of the auxiliary machine. This will shift the resultant field of the auxiliary machine and change the phase relation of its voltage with respect to that of the synchronous machine A, until the resultant voltage of the phase balancer will lower the voltage between mains 1 and 2.

The exciters E, E′ and G may be combined in one machine as shown in Figs. 2 and 3, in which case my phase balancer will then comprise only three machines, a synchronous machine A, an auxiliary machine B and an exciter M. The exciter M may be an ordinary direct current generator, in which case variable resistances would be placed in series with the field winding $a$ and the portions $b$ and $b'$ of the field winding of the auxiliary machine. In the arrangement shown in Fig. 2, sets of brushes $g$, $g$ diametrically opposite each other are connected to the field winding $a$, sets of brushes $e$, $e$ are connected to the portion $b$ of the field winding of auxiliary machine B, and sets of brushes $e'$, $e'$ are connected to the portion $b'$ of the field winding of the auxiliary machine. Diametrically opposite field poles on the exciter M are connected in shunt to the corresponding sets of brushes, and the field excitation of each pair of poles may be regulated and consequently the voltage generated between the sets of brushes $g$, $g$, $e$, $e$, and $e'$, $e'$, in the same way as the fields of exciters E, E′ and G are regulated by regulators F, F′ and H.

A phase balancer in accordance with my invention may be installed in a power station which furnishes unbalanced polyphase current due to, say a single phase load. It would be used in this case to maintain the voltage balanced and to increase the output of the generators in the station by allowing them to generate balanced polyphase current. My phase balancer may also be used on the distributing end of a transmission system to correct any unbalancing of the voltage of the system, and also, if provided with a suitable regulator dependent on the unbalanced load, to act as a synchronous condenser and maintain the voltage and power factor of the system.

I desire it to be understood that my invention is not limited to the particular arrangements described, and I aim in the appended claims to cover all modifications which do not depart from the spirit and scope of my invention.

What I claim as new and desire to secure by Letters Patent of the United States, is:—

1. A phase balancer comprising a synchronous dynamo-electric machine and an auxiliary dynamo-electric machine connected therewith, the phase rotation of said machines being opposite.

2. A phase balancer comprising a polyphase synchronous dynamo-electric machine and a polyphase auxiliary dynamo-electric machine connected in series therewith, the phase rotation of said machines being opposite.

3. A phase balancer comprising a synchronous dynamo-electric machine and an auxiliary dynamo-electric machine connected therewith, the phase rotation of said synchronous machine and said auxiliary machine being opposite, and means for relatively changing the phase relation of the voltages of said synchronous machine and said auxiliary machine.

4. In a system of transmission, polyphase mains, and means for balancing a component of the energy on said mains comprising a synchronous dynamo-electric machine and an auxiliary dynamo-electric machine connected in series across the mains, the phase rotation of said synchronous machine and said auxiliary machine being opposite, and means for shifting the phase of the voltage of said auxiliary machine relatively to that of said synchronous machine.

5. In a system of transmission, polyphase mains, and means for balancing a component of the energy on said mains comprising a polyphase synchronous dynamo-electric machine, a polyphase auxiliary dynamo-electric machine mechanically connected to said synchronous machine, the armature of said auxiliary machine being connected in series with the armature of said synchronous machine across the mains, the phase rotation of said synchronous machine and said auxiliary machine being opposite, and means for relatively changing the phase relation of the voltages of said synchronous machine and said auxiliary machine.

6. In a system of transmission, polyphase mains, and means for balancing a component of the energy on said mains comprising a polyphase synchronous dynamo-electric machine, a polyphase auxiliary dynamo-electric machine mechanically connected to said synchronous machine, the armature of said auxiliary machine being connected in series with the armature of said synchronous machine across the mains, the phase rotation of said synchronous machine and said auxiliary machine being opposite, and means for shifting the phase of the voltage of said auxiliary machine relatively to that of said synchronous machine.

7. In a system of transmission, polyphase mains, and means for balancing a component of the energy on said mains comprising a polyphase synchronous dynamo-electric machine, the armature thereof being connected to said mains, a polyphase auxiliary dynamo-electric machine mechanically connected to said synchronous machine, the armature of said auxiliary machine being connected in series with the armature of said synchronous machine and forming a Y-point for said synchronous machine, the phase rotation of said synchronous machine and said auxiliary machine being opposite, and means for relatively changing the phase relation of the voltage of said synchronous machine and said auxiliary machine.

8. In a system of transmission, polyphase mains, and means for balancing a component of the energy on said mains comprising a polyphase synchronous dynamo-electric machine, the armature thereof being connected to said mains, a polyphase auxiliary dynamo-electric machine mechanically connected to said synchronous machine, the armature of said auxiliary machine being connected in series with the armature of said synchronous machine and forming a Y-point for said synchronous machine, the phase rotation of said synchronous machine and said auxiliary machine being opposite, and means for shifting the phase of the voltage of said auxiliary machine relatively to that of said synchronous machine.

9. In a system of transmission, polyphase mains, and means for balancing a component of the energy on said mains comprising a synchronous dynamo-electric machine and an auxiliary dynamo-electric machine connected in series across the mains, the phase rotation of said synchronous machine and said auxiliary machine being opposite, a field winding for said auxiliary machine comprising a plurality of portions, and means for relatively varying the excitation of said portions so as to shift the phase of the voltage of said auxiliary machine relatively to that of said synchronous machine.

10. In a system of transmission, polyphase mains, and means for balancing a component of the energy on said mains comprising a synchronous dynamo-electric machine and an auxiliary dynamo-electric machine connected in series across the mains, the phase rotation of said synchronous machine and said auxiliary machine being opposite, a field winding for said auxiliary machine comprising a plurality of portions, a source of excitation for each of said portions, and means for varying the excitation of said portions so as to shift the phase of the voltage of said auxiliary machine relative to that of said synchronous machine.

11. In a system of transmission, polyphase mains, and means for balancing a component of the energy on said mains comprising a synchronous dynamo-electric machine and an auxiliary dynamo-electric machine connected in series across the mains, the phase rotation of said synchronous machine and said auxiliary machine being opposite, a field winding for said auxiliary machine comprising two portions arranged at substantially 90 electrical degrees, and means for relatively varying the excitation of said portions so as to shift the phase of the voltage of said auxiliary machine relative to that of said synchronous machine.

12. In a system of transmission, polyphase mains, and means for balancing a component of the energy on said mains comprising a synchronous dynamo-electric machine and an auxiliary dynamo-electric machine connected in series across the mains, the phase rotation of said synchronous machine and said auxiliary machine being opposite, a field winding for said auxiliary machine comprising two portions arranged at substantially 90 electrical degrees, a source of excitation for each of said portions, and means for varying the excitation of said portions so as to shift the phase of the voltage of said auxiliary dynamo-electric machine relatively to that of said synchronous machine.

13. In a system of transmission, polyphase mains, and means for balancing the voltage of said mains comprising a synchronous dynamo-electric machine and an auxiliary dynamo-electric machine connected in series across the mains, the phase rotation of said synchronous machine and said auxiliary machine being opposite, and means dependent upon the voltage of said mains for relatively changing the phase relation of the voltages of said synchronous machine and said auxiliary machine.

14. In a system of transmission, polyphase mains, and means for balancing the voltage of said mains comprising a synchronous dynamo-electric machine and an auxiliary dynamo-electric machine connected in series across the mains, the phase rotation of said synchronous machine and said auxiliary machine being opposite, and means dependent upon the voltage of said mains for shifting the phase of the voltage of said auxiliary machine relatively to that of said synchronous machine.

15. In a system of transmission, polyphase mains, and means for balancing the voltage of said mains comprising a polyphase synchronous dynamo-electric machine, a polyphase auxiliary dynamo-electric machine mechanically connected to said synchronous machine, the armature of said auxiliary machine being connected in series with the armature of said synchronous machine across the mains, the phase rotation of said synchronous machine and said auxiliary machine being opposite, and means dependent upon the voltage of said mains for relatively changing the phase relation of the voltages of said synchronous machine and said auxiliary machine.

16. In a system of transmission, polyphase mains, and means for balancing the voltage of said mains comprising a polyphase synchronous dynamo-electric machine, a polyphase auxiliary dynamo-electric machine mechanically connected to said synchronous machine, the armature of said auxiliary machine being connected in series with the armature of said synchronous machine across the mains, the phase rotation of said synchronous machine and said auxiliary machine being opposite, and means dependent upon the voltage of said mains for shifting the phase of the voltage of said auxiliary machine relatively to that of said synchronous machine.

17. In a system of transmission, polyphase mains, and means for balancing the voltage of said mains comprising a polyphase synchronous dynamo-electric machine, the armature thereof being connected to said mains, a polyphase auxiliary dynamo-electric machine mechanically connected to said synchronous machine, the armature of said auxiliary machine being connected in series with the armature of said synchronous machine and forming a Y-point for said synchronous machine, the phase rotation of said synchronous machine and said auxiliary machine being opposite, and means dependent upon the voltage of said mains for shifting the phase of the voltage of said auxiliary machine relatively to that of said synchronous machine.

18. In a system of transmission, polyphase mains, and means for balancing the voltage of said mains comprising a polyphase synchronous dynamo-electric machine, a polyphase auxiliary dynamo-electric machine mechanically connected to said synchronous machine, the armature of said auxiliary machine being connected in series with the armature of said synchronous machine across the mains, the phase rotation of said synchronous machine and said auxiliary machine being opposite, a field winding for said auxiliary machine comprising a plurality of portions, and means for relatively varying the excitation of said portions so as to shift the phase of the voltage of said auxiliary machine relatively to that of said synchronous machine.

19. In a system of transmission, polyphase mains, and means for balancing the voltage of said mains comprising a polyphase synchronous dynamo-electric machine, a polyphase auxiliary dynamo-electric machine mechanically connected to said synchronous machine, the armature of said auxiliary machine being connected in series with the armature of said synchronous machine across the mains, the phase rotation of said synchronous machine and said auxiliary machine being opposite, a field winding for said auxiliary machine comprising a plurality of portions, a source of excitation for each of said portions, and means for varying the excitation of said portions so as to shift the phase of the voltage of said auxiliary machine relatively to that of said synchronous machine.

20. In a system of transmission, polyphase mains, and means for balancing the voltage of said mains comprising a polyphase synchronous dynamo electric machine, a polyphase auxiliary dynamo-electric machine mechanically connected to said synchronous machine, the armature of said auxiliary machine being connected in series with the armature of said synchronous machine across the mains, the phase rotation of said synchronous machine and said auxiliary machine being opposite, a field winding for said auxiliary machine comprising two portions arranged at substantially 90 electrical degrees, and means for relatively varying the excitation of said portions so as to shift the phase of the voltage of said auxiliary machine relatively to that of said synchronous machine.

21. In a system of transmission, polyphase mains, and means for balancing the voltage of said mains comprising a polyphase synchronous dynamo-electric machine, a polyphase auxiliary dynamo-electric machine mechanically connected to said synchronous machine, the armature of said auxiliary machine being connected in series with the armature of said synchronous machine across the mains, the phase rotation of said synchronous machine and said auxiliary machine being opposite, a field winding for said auxiliary machine comprising two portions arranged at substantially 90 electrical degrees, a source of excitation for each of said portions, and means for varying the excitation of said portions so as to shift the phase of the voltage of said auxiliary machine relatively to that of said synchronous machine.

22. In a system of transmission, polyphase mains, and means for balancing the voltage of said mains comprising a polyphase synchronous dynamo-electric machine, the armature thereof being connected to said mains, a polyphase auxiliary dynamo-electric machine mechanically connected to said synchronous machine, the armature of said auxiliary machine being connected in series with the armature of said synchronous machine and forming a Y-point for said synchronous machine, the phase rotation of said synchronous machine and said auxiliary machine being opposite, a field winding for said auxiliary machine comprising a plurality of portions, and means for relatively varying the excitation of said portions so as to shift the phase of the voltage of said auxiliary machine relatively to that of said synchronous machine.

23. In a system of transmission, polyphase mains, and means for balancing the voltage of said mains comprising a polyphase synchronous dynamo-electric machine, the armature thereof being connected to said mains, a polyphase auxiliary dynamo-electric machine mechanically connected to said synchronous machine, the armature of said auxiliary machine being connected in series with the armature of said synchronous machine and forming a Y-point for said synchronous machine, the phase rotation of said synchronous machine and said auxiliary machine being opposite, a field winding for said auxiliary machine comprising a plurality of portions, a source of excitation for each of sand portions, and means for varying the excitation of said portions so as to shift the phase of the voltage of said auxiliary machine relatively to that of said synchronous machine.

24. In a system of a transmission, polyphase mains, and means for balancing the voltage of said mains comprising a polyphase synchronous dynamo-electric machine, the armature thereof being connected to said mains, a polyphase auxiliary dynamo-electric machine mechanically connected to said synchronous machine, the armature of said auxiliary machine being connected in series with the armature of said synchronous machine and forming a Y-point for said synchronous machine, the phase rotation of said synchronous machine and said auxiliary machine being opposite, a field winding for said auxiliary machine comprising two portions arranged at substantially 90 electrical degrees, and means for relatively varying the excitation of said portions so as to shift the phase of the voltage of said auxiliary machine relatively to that of said synchronous machine.

25. In a system of transmission, polyphase mains, and means for balancing the voltage of said mains comprising a polyphase synchronous dynamo-electric machine, the armature thereof being connected to said mains, a polyphase auxiliary dynamo-electric machine mechanically connected to said synchronous machine, the armature of said auxiliary machine being connected in series with the armature of said synchronous machine and forming a Y-point for said synchronous machine, the phase rotation of said synchronous machine and said auxiliary machine being opposite, a field winding for said auxiliary machine comprising two portions arranged at substantially 90 electrical degrees, a source of excitation for each of said portions, and means for varying the excitation of said portions so as to shift the phase of the voltage of said auxiliary machine relatively to that of said synchronous machine.

26. In a system of transmission, polyphase mains having an unbalanced load thereon, means for balancing the voltage of said mains comprising a synchronous dynamo-electric machine and an auxiliary dynamo-electric machine connected in series across the mains, the phase rotation of said synchronous machine and said auxiliary machine being opposite, and means dependent on the unbalanced load for changing the excitation of said synchronous machine.

27. In a system of transmission, polyphase mains having an unbalanced load thereon, means for balancing the voltage of said mains comprising a synchronous dynamo-electric machine and an auxiliary dynamo-electric machine connected in series across the mains the phase rotation of said synchronous machine and said auxiliary machine being opposite, means for relatively changing the phase relation of the voltages of said synchronous machine and said auxiliary machine, and means dependent on the unbalanced load for changing the excitation of said synchronous machine.

28. In a system of transmission, polyphase mains having an unbalanced load thereon means for balancing the voltage of said polyphase mains comprising a synchronous dynamo-electric machine and an auxiliary dynamo-electric machine connected in series across the polyphase mains, the phase rotation of said synchronous machine and said auxiliary machine being opposite, means for shifting the phase of the voltage of said auxiliary machine relatively to that of said synchronous machine, and means dependent on the unbalanced load for changing the excitation of said synchronous machine.

29. In a system of transmission a source of alternating current power, polyphase mains connected thereto, and means for balancing a component of the energy on said mains comprising a synchronous dynamo-electric machine and an auxiliary dynamo-electric machine connected in series across the mains, and means for shifting the phase of the voltage of said auxiliary machine relatively to that of said synchronous machine.

30. In a system of transmission, a source of alternating current power, polyphase mains connected thereto, and means for balancing a component of the energy on said mains comprising a polyphase synchronous dynamo electric machine, a polyphase auxiliary dynamo electric machine mechanically connected to said synchronous machine, the armature of said auxiliary machine being connected in series with the armature of said synchronous machine across the mains, and means for relatively changing the phase relation of the voltages of said synchronous machine and said auxiliary machine.

31. In a system of transmission, a source of alternating current power, polyphase mains connected thereto, and means for balancing a component of the energy on said mains comprising a polyphase synchronous dynamo electric machine, a polyphase auxiliary dynamo electric machine mechanically connected to said synchronous machine, the armature of said auxiliary machine being connected in series with the armature of said synchronous machine across the mains, and means for shifting the phase of the voltage of said auxiliary machine relatively to that of said synchronous machine.

32. In a system of transmission, a source of alternating current power, polyphase mains connected thereto, and means for balancing a component of the energy on said mains comprising a polyphase synchronous machine, the armature thereof being connected to said mains, a polyphase auxiliary machine mechanically connected to said synchronous machine, the armature of said auxiliary machine being connected in series with the armature of said synchronous machine and forming a Y-point for said synchronous machine, and means for relatively changing the phase relation of the voltages of said synchronous machine and said auxiliary machine.

33. In a system of transmission, a source of alternating current power, polyphase mains connected thereto, and means for balancing a component of the energy on said mains comprising a polyphase synchronous machine, the armature thereof being connected to said mains, a polyphase auxiliary machine mechanically connected to said synchronous machine, the armature of said auxiliary machine being connected in series with the armature of said synchronous machine and forming a Y-point for said synchronous machine, and means for shifting the phase of the voltage of said auxiliary machine relatively to that of said synchronous machine.

34. In a polyphase system of transmission, a phase balancer comprising a polyphase dynamo-electric machine and an adjustable source of alternating electromotive force of the same frequency connected thereto and adapted to force currents to flow in the circuits of said polyphase machine in such a manner that the phase rotation of the currents and electromotive forces of said machine are opposite.

35. In a polyphase system of transmission, a phase balancer comprising a polyphase dynamo-electric machine and an auxiliary adjustable source of alternating electromotive force of the same frequency connected thereto and adapted to force currents to flow in the circuits of said polyphase machine in such a manner that a certain portion of the winding of the machine operates as a motor while another portion of the winding of the machine operates as a generator whereby a transfer of load from one phase to another of the system is effected.

36. In a polyphase system of transmission, a phase balancer comprising a polyphase dynamo-electric machine and an auxiliary source of alternating electromotive force connected thereto and adjustable in phase and magnitude for introducing into the circuits of said polyphase machine a voltage of such phase and magnitude as to force currents to flow in the circuits of the polyphase machine in such a manner that the phase rotation of the currents and electromotive forces of the machine are opposite thereby effecting a transfer of load from one phase to another of the system.

37. In a polyphase system of transmission, a phase balancer comprising a polyphase synchronous dynamo-electric machine and an auxiliary adjustable source of alternating electromotive force of the same frequency connected thereto and adapted to introduce into the circuits of said polyphase machine alternating voltages of the proper phase and magnitude for forcing currents to flow in the circuits of the polyphase machine in such a manner that a certain portion of the winding of the machine operates like a motor while another portion of the winding of the machine operates like a generator whereby a transfer of load from one phase to another of the system is effected.

38. In a polyphase system of transmission, a phase balancer comprising a polyphase synchronous dynamo-electric machine and an auxiliary adjustable source of alternating electromotive force of the same frequency connected thereto and adapted to force currents to flow in the circuits of said polyphase machine in such a manner that the phase rotation of the currents and electromotive forces of said machine are opposite.

39. In a polyphase system of transmission a phase balancer comprising a polyphase synchronous dynamo-electric machine and an auxiliary adjustable source of alternating electromotive force connected thereto and adjustable in phase and magnitude for introducing into the circuits of said synchronous machine a voltage of such phase and magnitude as to force currents to flow in the circuits of said synchronous machine in such a manner that a portion of the machine operates as a motor while another portion of the machine operates as a generator whereby energy is drawn from one phase of the polyphase system by the synchronous machine and delivery thereby to another phase of the system.

In witness whereof, I have hereunto set my hand this 31st day of July, 1915.

ERNST F. W. ALEXANDERSON.